United States Patent [19]
Karam, II

[11] Patent Number: 5,359,479
[45] Date of Patent: Oct. 25, 1994

[54] MAGNETIC HEAD SLIDER HAVING A MAGNETIC TRANSDUCING ELEMENT AFFIXED TO A SLIDER BODY SIDE SURFACE

[75] Inventor: Raymond M. Karam, II, Santa Barbara, Calif.

[73] Assignee: Applied Magnetics Corporation, Goleta, Calif.

[21] Appl. No.: 897,866

[22] Filed: Jun. 12, 1992

[51] Int. Cl.$^5$ .............................................. G11B 5/60
[52] U.S. Cl. ................................................... 360/103
[58] Field of Search ........................................ 360/103

[56] References Cited

U.S. PATENT DOCUMENTS

| | | | |
|---|---|---|---|
| 4,823,216 | 4/1989 | Atesmen et al. | 360/103 |
| 4,854,659 | 8/1989 | Hamerslag et al. | 350/96.15 |
| 4,928,195 | 9/1990 | Ezaki et al. | 360/103 |
| 5,105,529 | 4/1992 | Yasan et al. | 360/103 X |

FOREIGN PATENT DOCUMENTS

| | | | |
|---|---|---|---|
| 468740 | 1/1992 | European Pat. Off. | 360/103 |
| 488539 | 6/1992 | European Pat. Off. | 360/103 |
| 61-137288A | 6/1986 | Japan . | |
| 281117 | 12/1987 | Japan | 360/103 |
| 52317 | 3/1988 | Japan | 360/103 |
| 276420 | 11/1989 | Japan | 360/103 |
| 263302 | 10/1990 | Japan | 360/103 |
| 49110 | 10/1991 | Japan | 360/103 |

OTHER PUBLICATIONS

*The How and Why of Slider Downsizing* by Dr. Paul W. Smith, Magnetic Headlines, Special Comdex Edition, Oct. 1991, pp. 1 & 4 [Submission is an 3-8½×11 pages].
*Stress Analysis of Glass Bonded Ferrite Recording Heads* by T. Tang; IBM J. Res. Develop., May 1974, pp. 274–278.
*Auger Spectroscopy Analysis of Metal/Ferrite Interface Layer in Metal-In-Gap Magnetic Head* by K. Kajiwara et al; IEEE Transactions on Magnetics, vol. 24, No. 6, Nov. 1989 pp. 2620–2622.
1991 Head/Media Technology Review, Conference Summer, Oct. 20, 1991, p. 142.

Primary Examiner—Richard E. Gluck
Attorney, Agent, or Firm—Daniel J. Meaney, Jr.

[57] ABSTRACT

A composite magnetic head slider is shown. The magnetic head slider includes a slider body having a leading edge, a trailing edge and a side surface extending therebetween. The slider body includes an hydrodynamic surface which co-acts with an air cushion on a moving magnetic media and the hydrodynamic surface includes an air bearing surface which extends between the leading edge and trailing edge of the slider body. The air bearing surface is substantially perpendicular to the side surface. A magnetic transducing element formed of a polycrystaline ferrite material and having a transducing gap located adjacent the trailing edge and air bearing surface is rigidly joined to the side surface of the slider with a bonding layer comprising a material by weight approximately 80% gold and approximately 20% tin.

The magnetic head slider can be fabricated to have outer dimensions for 100%, 70%, 50%, 25% or 10% or any other selected percentage form factor magnetic head slider having operating characteristics similar to those of more expensive deposited thin film magnetic transducers.

A method for fabricating a composite magnetic head slider is shown.

28 Claims, 4 Drawing Sheets

MAGNETIC HEAD SLIDER HAVING A MAGNETIC TRANSDUCING ELEMENT AFFIXED TO A SLIDER BODY SIDE SURFACE

BACKGROUND OF THE INVENTION

1. Field of the Invention

This invention relates to a composite magnetic head slider which is adapted for flying on an air cushion over a moving magnetic media for recording and reproducing information and, more particularly, to a magnetic head slider assembly wherein a slider body has a side surface which extends substantially perpendicular to an air bearing surface and wherein the slider body has bonded thereto on the side surface thereof a magnetic transducing element. The magnetic transducing element is formed of a polycrystaline ferrite material having a transducing gap located adjacent the trailing edge and air bearing surface. In the preferred embodiment, the magnetic transducing element is affixed to the slider body by means of a bonding layer material in a eutectic mixture comprising by weight approximately 80% gold and approximately 20% tin. This bonding layer material may comprise any other metallic alloy with a melting temperature of less than the melting temperature of the gap material.

2. Description of the Prior Art

A magnetic head slider which is adapted for flying on an air cushion over a moving magnetic media for recording and reproducing tracks of information thereon is well known in the art. The primary use of such magnetic head sliders is in rigid disc drive assemblies. In such disc drive assemblies, it is well known to those skilled in the art to utilize techniques such as down-sizing of magnetic head slider assemblies to reduce disc-to-disc spacing in a drive assembly. Also, it is known in the art that decreasing the data track width increases the storage capacity by increasing the number of data tracks of information on a disc. Also, by reducing the inductance of the head, the recording density on a disc, i.e. flux reversals per inch, can be increased, thus increasing the data that may be stored on the disc.

As a result of the demand to reduce the disc-to-disc spacing and the overall dimensions of a disc drive assembly and in order to improve the operating characteristics of magnetic recording heads used in such applications, magnetic recording heads and magnetic head slider assemblies used in rigid rotating disc drives are decreased in physical size. Further, the characteristics of magnetic transducing heads including read/write gaps, track widths, flying heights are being reduced, while overwrite characteristics are being improved.

By utilizing slider bodies having smaller sizes, the smaller sizes permit processing of slider bodies in a wafer structure using technologies similar to those used for manufacturing thin film devices such as, for example, deposited thin film magnetic transducing heads.

This size reduction in the magnetic head slider is generally accomplished by controlling the height, length and width of the slider body combined with the placement of the read/write or magnetic transducing element in a selected position on the slider body.

The above is generally referred to in the art as "down-sizing". In order to achieve the above objectives several magnetic head slider assemblies have developed in the art. The following are typical examples of the state-of-the-art.

U.S. Pat. No. 4,823,216 discloses a monolithic magnetic head slider assembly having "C" shaped core element formed of the same material as a slider body. This is one example of a 100% form factor slider having a height of about 0.034 inches.

Figure 1:
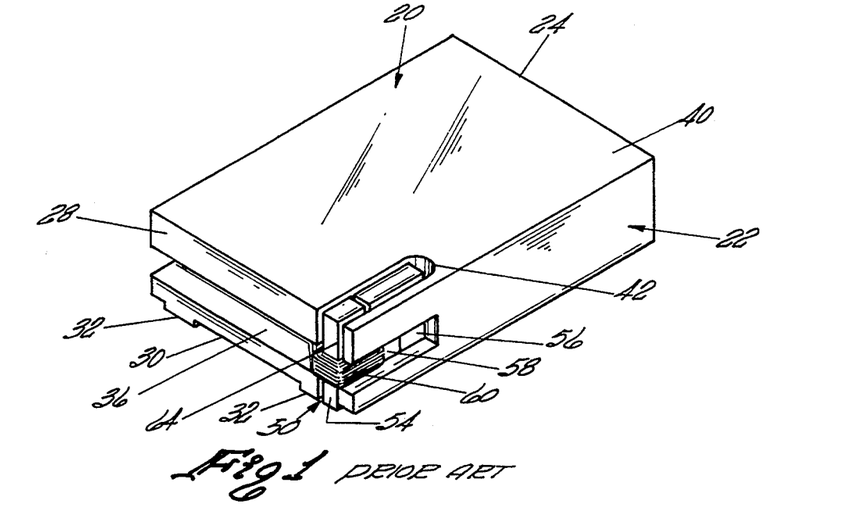
FIG. 1 is a top, left side and front perspective view of a composite magnetic head slider assembly of the Prior Art having a core assembly potted into a coil receiving slot.

Another magnetic head slider known in the art is the composite magnetic head slider assembly. A typical composite magnetic head slider assembly is illustrated as FIG. 1 of the drawing and is labeled as Prior Art. In FIG. 1, a slider body 20 includes a leading edge 24, a trailing edge 28 and an hydrodynamic surface 30. The hydrodynamic surface 30 is positioned adjacent to a moving magnetic media and co-acts with an air cushion formed by the moving media. A pair of spaced, parallel load rails each having an air bearing surface 32 is formed on the hydrodynamic surface 30. In addition, a side surface 22, which is substantially normal to the hydrodynamic surface 30 and the air bearing surface 32, extends between the leading edge 24 and the trailing edge 28.

The trailing edge 28 has a transverse slot 36 formed therein which is substantially perpendicular to the air bearing surface. The slider body 20 includes a top surface 40 and an elongated core receiving slot 42 that is formed in the top surface 40. The elongated core receiving slot 42 extends through the slider body in the area located at the intersection of the side surface 22 and the trailing edge 28. The elongated core receiving slot 42 is adapted to receive a magnetic transducing element or core assembly shown generally as 50. The magnetic transducing element 50 is typically formed of an "I" bar 54 and a "C" bar 56. A coil winding window 58 is formed in the "C" bar 56.

A coil 60 is wound around and encloses the center of the "I" bar 54. The coil 60 is wound through the coil winding window 58 through the transverse slot 36 to form the magnetic transducing element 50. The magnetic transducing element 50 is secured within or potted into the elongated core receiving slot 42 by means of a bonding material 64 such as, for example, glass, epoxy or the like. Thus, the magnetic transducing element 50 is bonded and held rigidly in place in the elongated core receiving slot 42.

The composite magnetic head slider assembly of FIG. 1 is generally referred to as a 100% form factor slider and has dimensions comprising a height (the distance between the air bearing surface on the hydrodynamic surface and the top surface) of 0.034 inches, a length (between the leading edge and the trailing edge) of 0.160 inches and a width (between the two parallel side surfaces) of 0.126 inches.

Typically, a composite magnetic head slider assembly, as is illustrated in FIG. 1, is limited as to the amount of down-sizing that can be achieved using this structure due to several factors. Physically handling individual magnetic transducing elements 50 of 50% form factor and smaller heads becomes difficult, and physically inserting one core at a time into the slider body is very labor intensive as compared to thin-film head manufacturing techniques. Also, as the size of the magnetic transducing element, which is fabricated from ferrite and/or other high permeability magnetic material, is reduced, internal stresses build up in the magnetic transducing element as a result of the reduced structural size of the core element formed by the "I" bar and "C" bar members, the glass bonding material and glass filler material in the core and the bonding or potting material used to hold the core or magnetic transducing element in the elongated core receiving slot. In general, a high residual stress in the magnetic transducer from glass bonding limits the magnetic transducing elements operating characteristics. However, as the sizes of the "I" bar and "C" bar are reduced, the residual stress from the glass is not reduced. Therefore, the performance of the transducer is limited to an even greater extent than that of the full size transducer.

Figure 2:
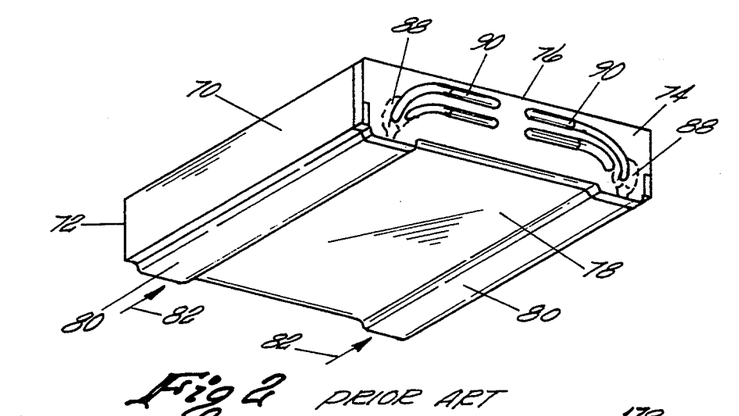
FIG. 2 is a bottom, front and right side perspective view of a thin film magnetic head assembly having thin film transducers deposited on the trailing edge thereof in the form of a 70% form factor magnetic head slider assembly.

In order to overcome certain disadvantages of composite magnetic head assemblies, illustrated in FIG. 1 and as described above, thin film magnetic head slider assemblies have been developed. Typical of the present thin film magnetic head slider assemblies is a magnetic head slider assembly disclosed in U.S. Pat. No. 4,928,195. FIG. 2 shown herein and labelled as Prior Art is the thin film magnetic head slider assembly shown herein is based on FIG. 1 in U.S. Pat. No. 4,928,195. In FIG. 2 herein, a slider body 70 is formed to have a leading edge 72, a trailing edge 74, a top surface 76 and a hydrodynamic surface 78. The hydrodynamic surface 78 is formed to have a pair of spaced, parallel load rails, shown generally as 80, which extend generally in direction of media movement shown by arrows 82.

The pair of spaced, parallel load rails 80 are of the same widths and have an air bearing surface (ABS) formed thereon which are utilized as the hydrodynamic flying surface for the magnetic head slider assembly.

The trailing edge 74 of the magnetic head slider assembly 70 has deposited thereon thin film magnetic transducers 88 and deposited electrically conductive members 90 which are operatively connected to the thin film magnetic transducers 88.

The thin film magnetic head slider assembly of FIG. 2 is generally referred to as a 70% form factor slider and has the following dimensions: a thickness of 0.024 inches, a length of 0.112 inches and a width of 0.88 inches.

Another known prior art magnetic head slider assembly which is another example of a 70% form factor magnetic head slider assembly is disclosed in Japanese Laid-open Patent Application 61-137288 (A). Japanese Laid-open Patent Application 61-137288 (A) discloses a slider body having a pair of spaced, parallel rails having air bearing surfaces located on the hydrodynamic surface which are adapted to fly on the air cushion formed on the rotating magnetic media. The relationship between respective rails in Japanese Laid-open Patent Application 61-137288 (A) is that the width of the inner peripheral rail is wider than the width of the outer peripheral side and the relationship between the air bearing surfaces is fixed by the size of the respective parts and the value of the acting air pressure. The slider body in Japanese Laid-open Patent Application 61-137288 (A) has the following dimensions: a thickness of about 0.024 inches, a length of about 0.120 inches and a width of about 0.80 inches.

U.S. Pat. No. 4,894,740 discloses a thin film magnetic head slider which has dimensions approximating a 50% form factor magnetic head slider assembly. The magnetic head slider of U.S. Pat. No. 4,894,740 has a three rail design wherein each rail has an air bearing surface.

As noted above, it is clear that the state-of-the-art magnetic head slider assemblies are continually being reduced in size. The results of analysis of reduced sized slider using a finite element air bearing program based on use of a program known as "AIRHEAD" is described in an article entitled *The How and Why of Slider Downsizing* by Dr. Paul W. Smith, which appeared in the Magnetic Headlines, Special Comdex Edition, October, 1991, pages 1 and 4 (the "Smith Reference").

The Smith Reference used a "mythical" family of disc drives whose key dimensions are as follows: % Mass or Size Relative to 100% Form Factor

| Form Factor | Length | Width | Thickness | % Mass or Size Relative to 100% |
|---|---|---|---|---|
| 100% | .160" | .126" | .034" | 100% |
| 70% | .112" | .088" | .024" | 35% |
| 50% | .080" | .063" | .017" | 12% |
| 25% | .040" | .030" | .008" | 1.4" |
| 10% | .016" | .013" | .004" | 0.12" |

The Smith Reference concluded that down-sized sliders also incorporate lower gram loads and, as a result thereof, the vertical stiffness of the bearing is more than adequately compensated by the reduced mass as shown by the slide form factor curves plotted as a function of a normalized stiffness and frequency as shown in the Smith Reference. Also, the Smith Reference concluded that smaller discs also tended to exhibit lower surface acceleration which improves vertical tracking as well.

It is also known in the art to utilize a slider body in combination with a single crystal ferrite material forming the magnetic transducing element wherein the magnetic transducing element is attached to the side surface of the slider body using a glass bond and known glass bonding techniques. The use of glass bonding techniques are well known in the art and are used primarily for joining together the ferrite elements of a magnetic transducing assembly and as a fillet glass for filling a fillet glass region in an "I" bar and "C" bar core assembly.

Glass bonded ferrite recording heads are subject to appreciable thermal stress because of the differences in thermal expansion between glass and ferrite over the temperature range of the glassing cycle. This is due, in part, not only to thermal stresses developed between the glass bonding layer and the ferrite material, but also to the structural configuration arising from magnetic design constraints, such as the need to focus the magnetic flux at the gap (i.e. with an apex). An analysis of the causes of stress in glass bonded ferrite heads are described in a paper entitled *Stress Analysis of Glass-Bonded Ferrite Recording Heads* by T. Tang which appeared in the IBM J. Res. Develop., May 1974, pages 274 through 278 inclusive (the "Tang Reference"). The stress analysis described in the Tang Reference is particularly applicable to composite magnetic head sliders described hereinbefore.

However, it is not known in the prior art to utilize a production composite magnetic head slider assembly for magnetic head slider assemblies having a form factor of less than 70% for reasons described above.

SUMMARY OF THE PRESENT INVENTION

A novel, unique and improved composite magnetic head slider assembly is disclosed and taught by the present invention. The magnetic head slider includes means for defining a slider body having a leading edge, a trailing edge and a side surface extending therebetween. The slider body defining means includes means defining on an hydrodynamic surface an air bearing surface which extends between the leading edge and the trailing edge and the air bearing surface is substantially perpendicular to the side surface of the slider body. The magnetic head slider further includes means operatively attached to the side slider surface of the slider body for defining a magnetic transducing element formed of a polycrystaline or single crystal ferrite material and having a transducer gap located adjacent the trailing edge and the air bearing surface. The magnetic transducing element is glass bonded or epoxy bonded to the side surface of the slider body.

In the preferred embodiment, the magnetic transducing element is in the form of a "I" bar and a "C" bar or two "C" bars. The "I" bar and "C" bar, or two "C" bars, are positioned relative to each other to define a transducing gap which is located adjacent the trailing edge and the air bearing surface.

The magnetic transducing element is bonded to the side surface of the slider body by means of a bonding layer material comprising, in the preferred embodiment, by weight of approximately 80% gold and approximately 20% tin.

By utilizing the teachings of the present invention, the size of the magnetic head slider can be down-sized to handle a magnetic head slider assembly which has about a 10% or less form factor based upon the 100% slider form factor as described by the Smith Reference.

Also, a method for fabricating a composite magnetic head slider is shown. The method comprises forming a thin polycrystaline or single crystal magnetic transducing element including an "I" bar having a pair of ends and a "C" bar having a pair of extended arms wherein the "I" bar and "C" bar including means for defining a transducing gap between one end of the "I" bar and one extended arm of the "C" bar and means for forming a magnetic path between the other end of the "I" bar and other extended arm of the "C" bar. The method further includes the step of bonding the magnetic transducing element to the side surface of a material defining the slider body.

The known prior art composite magnetic head slider as shown in FIG. 1 Prior Art utilizes a high permeability ferrite material in the magnetic transducing element in the form of a thick "I" bar and "C" bar structure having a stepped transducing gap to form a thin, extended transducing edge. The "I" bar and "C" bar structure are glass bonded to form a transducing gap having dimensions on the order of tens of micro-inches adjacent a glass support which fills in a step adjacent the gap wherein the step is 2 to 3 thousands of an inch. The "C" bar is fabricated with a glass ferrite region which includes a sloping inner surface which defines a single sided apex and which establishes the throat height of the transducing gap. The "I" bar and "C" bar structure together with a wound core enclosing the "I" bar is fixedly located in an elongated core receiving slot positioned in and which extends through the slider body adjacent the trailing edge as described above. The physical structure of the core receiving slot positions the transducing gap to be integral with the air bearing surface.

The magnetic transducing element of the prior art composite magnetic head slider is typically secured within or potted in the core receiving slot with glass on the air bearing surface and epoxy on the side opposite the air bearing surface. As a result, the magnetic transducing element or core assembly is secured by a mechanically constrained system. As a result, the clamping and holding forces of the mechanically constrained system tend to prevent the ferrite material from expanding and contracting during the read/write process, which retards the ability of the magnetic dipoles within the ferrite material to freely rotate. This results in mechanically imposed magnetic saturation level within the thick ferrite member.

Down-sizing of the prior art composite magnetic head slider structure for use in state-of-the-art disc drive assemblies has been based substantially on using smaller ferrite "I" bar and "C" bar structure and have limited operating characteristics due to the stress factors discussed hereinbefore. It has developed that such structures are difficult to fabricate. Also, the mechanically constrained magnetic cores formed of the "I" bar and "C" bar are limited at unacceptably low operating frequencies due to saturation of the ferrite material. Also, the high inductance of thick ferrite member tends to increase the amount of noise, which, in turn, reduces the signal-to-noise ratio of the transduced electrical signals.

As the size of the slider body is decreased, the mechanical strength and integrity of the air bearing surface and support rail located adjacent the door receiving slot are reduced thereby increasing the likelihood of the air bearing surface being mechanically deformed during the coil winding procedure. This is known in the art as "ski jump". The smaller the structure, the greater the "ski jump" problem.

As noted herebefore, 70% form factor magnetic head slider assemblies have been successfully fabricated using deposited thin film transducers as well as monolithic and composite technologies. However, the fabrication cost of 50% thin film transducers is substantially greater than the fabrication cost of 50% side core magnetic head sliders.

In further down-sizing of thin film magnetic head sliders for smaller form factor slider applications, the same manufacturing procedures are required. However, because of the reduced size of the 50% slider, more transducers can be placed on a thin film wafer, thus making thin film heads more cost competitive. Therefore, the conventional, single-slider assembly methods for ferrite heads are typically replaced by a wafer level method to be cost competitive with thin film techniques.

The fabrication of the prior art magnetic head slider assembly having a thin, single crystal or polycrystaline ferrite material for the magnetic transducing element and glass bonding of the same to the side surface of the slider results in a structure having a very weak bond between the ferrite material and slider body. This is due, in part, to the glass bonding material reacting with the slider body material to form small bubbles reducing the effectiveness of the glass bond between the ferrite material and glass. As the size of the magnetic head slider is reduced, the bonding problems become more severe.

Also, it has developed that the mechanical resonant frequency of single crystal ferrite is on the order of tens of megahertz for 100% sliders. At certain operating frequencies, this results in the magnetic domains within the single crystal ferrite being driven such that noise is produced due to mechanical vibration. This is known in the art as "ringing."

This problem can be avoided by damping the single crystal ferrite using techniques known in the art. Another method for solving this problem, in accordance with the teachings of the present invention, is to control the mechanical dimensions of the transducer to cause the fundamental reasonant modes developed by the transducer to be higher than the frequency of transducer operation. However, polycrystaline ferrite is the preferred material for the magnetic transducing element.

The present invention overcomes certain of the above described disadvantages of the prior art composite magnetic head slider assemblies and the thin film magnetic head slider assemblies.

One advantage of the present invention is that the magnetic transducing element is rigidly joined to the side surface of a magnetic head slider to form an integral magnetic head slider assembly as an integral assembly can be mechanically processed through various manufacturing steps as a wafer.

Another advantage of the present invention is that the magnetic transducing element can be fabricated of very thin ferrite members in the form of an "I" bar and a "C" bar. The "I" bar and "C" bar which define the magnetic transducing element are rigidly joined to the side surface of the magnetic head slider. The term "rigidly joined", as used herein, means that the magnetic material, such as ferrite, for example, is affixed to and attached to the slider body with an aggressive bonding material having a eutectic point which is less than the temperature where the magnetic characteristics of the magnetic transducing element are impaired. Further, the material used as the bonding material can be used in conjunction with other layers so as to prevent migration of molecules of the bonding material into the ferrite material. In the preferred embodiment, the bonding layer is formed of a material having by weight approximately 80% gold and approximately 20% tin.

Another advantage of the present invention is that one embodiment of the magnetic head slider body has a trailing edge which has a transverse slot therein which intersects with the side surface of the magnetic head slider body to form an opening. When the magnetic transducing element formed of the thin "I" bar and "C" bar is bonded to the side surface of the slider body, a coil winding window located in the "C" bar of the magnetic transducing element is positioned in alignment with and communicates with the opening formed by the transverse slot. This enables the winding of coil wire around the "I" bar portion of the magnetic transducing element to produce a wound coil.

Another advantage of the present invention is that in the preferred embodiment the "ski jump" effect described earlier can be reduced. In this embodiment, a diagonal slot is made adjacent to the top of one "C" bar and in the surface opposite the air bearing surface, and the "I" and "C" bars are recessed from this surface. This structure will avoid deformation of the air bearing surface during the coil winding procedure, i.e., "ski jump".

Another advantage of the present invention is that the magnetic transducing element is rigidly joined to the side surface of the slider body, the entire assembly can then be processed, e.g. lapped and polished, to produce a sloped surface on the magnetic transducing element. The sloped surface results in a small transducing gap being positioned adjacent the air bearing surface. The slope surface of the magnetic transducing member forms an acute angle with a plane defined by the air bearing surface.

Another advantage of the present invention is the magnetic transducing element is disposed on the side surface of the magnetic head slider body thereby making the throat height visible during manufacturing. Therefore, during the steps of lapping and polishing the magnetic transducing element, the throat height of the transducing member can be precisely monitored or controlled by optical inspection means.

Another advantage of the present invention is that the means for rigidly joining the magnetic transducing element to the side surface of the slider can be formed of a plurality of layers. In the preferred embodiment, an adhesion layer is located between a bonding layer and the slider body. The opposite side of the bonding layer has an adhesion layer and a thin diffusion layer with the thin diffusion layer being affixed or attached to the magnetic transducing element. In this manner, migration of undesired molecules or atoms into the transducing element material is substantially eliminated, on one hand, while on the other hand, a rigid, secured bond is maintained between the ferrite and the slider body.

Another advantage of the present invention is that the magnetic transducing element can be formed of separate "I" bar and "C" bar which are joined together to form the transducing gap. The thin ferrite elements have a width of approximately 28 mils prior to being lapped and polished. Thereafter, during the lapping and polishing step, the thickness of the ferrite element in the area of the transducing gap can be lapped to a thickness of about 300 microinches. In this manner, the rigidity of the magnetic transducing element is maintained by the thicker upper portion of the "I" bar and "C" bar which are joined together to form a magnetically connective path at a location opposite to the transducing gap.

Another advantage of the present invention is that by utilizing a polycrystaline ferrite material in the core material, the amplitude of mechanical resonance of the ferrite members is small enough so as to not interfere with the performance of the head, i e., "ringing" does not occur. Thus, the fabrication of the thin ferrite "I" bar and "C" bar utilizing a polycrystalize ferrite overcomes the "ringing" problem associated with the prior art.

Another advantage of the present invention is that by utilizing a single crystal ferrite material wherein the mechanical dimensions of the transducer are controlled to cause the fundamental reasonant modes developed by the transducer to be higher than the frequencies of transducer operation, ringing does not occur. This can be accomplished by controlling the mechanical dimension of the core, such as, the length of the "I" bar being vibrated. Also, the core could be damped using known techniques.

Another advantage of the present invention is that the structure of the slider body having the magnetic transducing element rigidly joined to the side surface thereof overcomes the problem of "ski jumping" that occurs during coil winding step of the prior art.

Another advantage of the present invention is that the structure of the slider body having the magnetic transducing element rigidly joined to the side surface of the slider body utilizes an aggressive bonding material which does not interact with the ferrite thereby avoiding the problems of bubbles and the like which would otherwise affect the adhesion characteristic of the bonding layer and which, in turn, insures that the magnetic transducing element is securely bonded to the slider body.

Another advantage of the present invention is that the composite magnetic head slider assembly can be down-sized for use in the advanced state-of-the-art disc drives and can be specifically utilized to fabricate sliders having a selected form factor of 100%, 70%, 50%, 25% and 10% or less.

Another advantage of the present invention is that a wedgeshaped slot can be formed into the top surface of the slider body to define an opening in the side wall of the magnetic head slider assembly. In one embodiment, a coil can be wound around one extended arm of the "C" bar. In another embodiment, a magnetic transducing element can be fabricated in a manner such that a portion of the "C" bar can be replaced by a thin elongated ferrite element which extends between and joins with one end of an "I" bar and to the "C" bar to form a magnetic flux path therebetween. The thin elongated ferrite member can be passed through the central opening of a pre-wound coil and to form a coil/ferrite sub-assembly. The sub-assembly can be mounted onto the slider body to complete the magnetic circuit between the "I" bar and "C" bar. The pre-wound coil is positioned in the wide portion of the wedge opening and in the coil winding window of the "C" bar. This structure permits the use of machine wound coils to form the pre-wound core used in the coil ferrite member subassembly. The sub-assembly can be utilized for fabricating the composite magnetic head slider of the present invention.

Another advantage of the present invention is that a bonding glass is eliminated from the transducing apex, relative to the known prior art assemblies. In the known prior art assemblies, a glass material is utilized to form the gap and to fill in the glass fillet region between ferrite members.

Another advantage of the present invention is that glass can be eliminated from the core and the transducer completely. This will allow lowering the bonding temperature of the slider and make it possible to use higher magnetic saturation materials in the gap (i.e. metal-in-gap or "MIG"), as is well known to persons skilled in the art and as described hereinbelow, rather than the current MIG materials, such as alfesil (AlFeSi).

Another advantage of the present invention is that the overwrite characteristics of the transducing element is improved because stress within the "I" bar and "C" bar is reduced due to the fact that low mechanical forces are applied to the exterior of the element. As such, the ferrite is permitted to expand and contract in response to the electrical signals applied thereto. The improved overwrite results are obtained because the mechanically unconstrained ferrite permits the magnetic dipoles within the ferrite material to align with the lines of magnetomotive force. As such, the problems associated with the prior art magnetic transducing elements wherein the glass materials and epoxy or potting materials applying stress to the exterior of the ferrite material are overcome by the unique structure of the present invention.

Another advantage of the present invention is that the composite magnetic head slider assembly can be operatively attached to a load arm having a support end and a head slider loading end. The magnetic head slider assembly is operatively attached to the head slider end or the loading arm so as to be operative therewith. The magnetic head slider assembly of the present invention can be utilized with a wide variety of load arms and has particular application for use with load arm used in disc drives having reduced disc-to-disc spacing requirements.

BRIEF DESCRIPTION OF THE DRAWING

The foregoing and other advantages of the present invention will be apparent from the following description of the preferred embodiment of the invention considered with the illustrations and accompanying drawings which include the following Figures.

DESCRIPTION OF THE PREFERRED EMBODIMENT

FIGS. 1 and 2 are illustrative of the Prior Art magnetic head slider assemblies and have been discussed in the Prior Art section hereof. As noted hereinbefore, FIG. 1 illustrates a 100% form factor composite magnetic head slider assembly. FIG. 2 illustrates a 70% form factor thin film magnetic head slider assembly utilizing thin film magnetic head transducers which are deposited on the trailing edge of the slider body.

Figure 3:
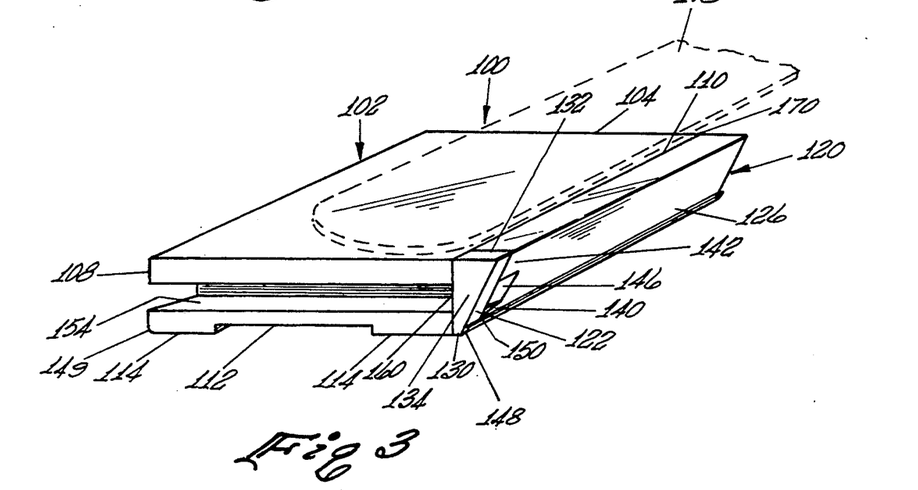
FIG. 3 is a top, left and front perspective view of a composite magnetic head slider assembly of the present invention having a magnetic transducing element rigidly joined to the side surface of a slider body.

FIG. 3 illustrates the preferred embodiment of the magnetic head slider of the present invention. The magnetic head slider is shown generally as 100. The magnetic head slider 100 includes means defining a slider body, shown generally as 102, having a leading edge 104, a trailing edge 108 and a side surface 110 extending therebetween. The slider body defining means 102 includes means for defining an hydrodynamic surface 112 which is adapted to co-act with a viscous air cushion on a rotating magnetic media. The hydrodynamic surface 112 includes means for defining an air bearing surfaces 114 which extend between the leading edge 104 and the trailing edge 108 of the slider body 102. The air bearing surfaces 114 are substantially perpendicular to the side surface 110.

As illustrated in FIG. 3, means for defining a magnetic transducing element 120 which is rigidly joined to the side surface 110 of the slider body 102 is shown. The magnetic transducing element 120, in the preferred embodiment, is formed of an "I" bar 122 and a "C" bar 126. The "I" bar has a pair of extended ends shown generally as 130 and 132 and a center section 134. The "C" bar member has a pair of extended arms shown generally as 140 and 142 and a coil winding window shown as 146 formed therein.

In the preferred embodiment, the "I" bar and "C" bar are formed of a polycrystaline, high permeability ferrite material such as nickel-zinc ferrites or manganese-zinc ferrites. One end 130 of the "I" bar 122 is positioned opposite one extended arm 140 of the "C" bar to form therebetween a magnetic transducing gap shown generally as 150. The spacing in the transducing gap is defined by the thickness of a magnetically insulating material such as, for example, silicon dioxide ($SiO_2$).

As illustrated in FIG. 3, the magnetic transducing gap 150 is located adjacent the trailing edge 108 and the air bearing surface 114. This enables the transducing gap to co-act with the magnetic media located adjacent the magnetic head slider.

As shown in FIG. 3, the air bearing surface as in the form of a pair of parallel load rails. However, the air bearing surface can be of any shape, pattern or geometric design which enables the magnetic head slider to fly over a moving magnetic medium.

The trailing edge 108 of the slider body 102 includes means for defining a transverse slot 154 which intersects with the side surface 110 to form an opening 160 therein. The position of the opening 160 is such that it communicates with the coil winding window 146 formed in the "C" bar 126.

The magnetic head slider assembly illustrated in FIG. 3 is a partially completed magnetic head slider assembly in that it does not have the coil wound around the "I" bar. Also, the magnetic transducing element 120 has been lapped and polished to form a sloped surface on the "I" bar and "C" bar which is formed an acute angle so as to intersect with a plane defined by the air bearing surface 114. This results in the transducing gap having a thickness of about 40–500 microinches in the plane of the air bearing surface. The opposite end of the magnetic transducing element 120 has a thickness of between 2 to 25 mils and the difference in thickness decreases in a direction towards the transducing gap 150 positioned adjacent the air bearing surface 114 and the trailing edge transducing element is generally trapezoidal in shape with the longest parallel side located substantially at the top surface 162 of the slider body 102.

FIG. 3 also illustrates that the magnetic transducing element 120 is rigidly joined to the side surface 110 by a bonding layer shown generally as 170. In the preferred embodiment, the bonding layer is formed of a material by weight of approximately 80% gold and approximately 20% tin.

The material selected as the bonding layer for rigidly joining the magnetic transducing element to the side surface of the magnetic head slider body is selected to be of a material which aggressively adheres to both the ferrite material defining the "I" bar and "C" bar on one hand, and on the other hand, to the side surface of the material defining the slider body. In the preferred embodiment, the slider body is made of calcium titanate but may be any thermally mismatched material such as $Al_2O_3TiC$. However, the thermal characteristics may also be matched. The material characteristics of the bonding layer compensates for the differences in thermal coeffecients of expansions between the ferrite core and the slider body material.

Other materials having the appropriate strength and temperature resistance and low magnetic permeability which could be used as a slider body material includes metal oxide alloys, such as, for example, barium titanate ($BaTiO_2$), alloyed alumina and titanium carbide and manganese and ceramics such as nickel oxide.

The ferrite material utilized to form the transducing gap between the "I" bar and "C" bar need not be selected to have substantially the same thermal expansion/contraction characteristics of the material forming the slider body. The ferrite material must be of sufficient strength so as to resist physical deformations during temperature changes over a temperature processing range, for example, from approximately 20° Centigrade to about 700° Centigrade.

A load arm shown by dashed line element 178 may be operatively coupled to the magnetic head slider assembly 100. The loading arm 178 has a support end and a head slider end.

As shown in FIG. 3, a formed edge 148 can be made on the magnetic head slider assembly by any well known depositing means, such as for example, by sputtering or vapor deposition. In a subsequent operation, this formed edge 148 and the opposite elongated slider edge 149 are shaped or blended by well known means, to improve the hydrodynamic and tribological performance of the slider.

Figure 4:
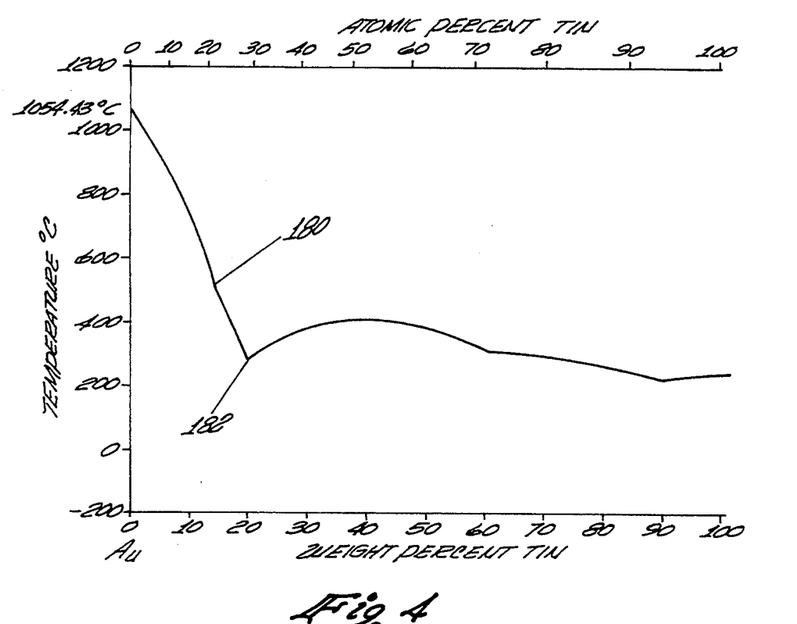
FIG. 4 is a binary alloy phase diagram showing the relationship of a boding material formed by weight of gold and tin plotted as a function of temperature showing that the eutectic point of an alloy comprising about 80% gold and about 20% tin.

FIG. 4 is an binary alloy phase diagram of an eutectic formed by weight of gold and tin plotted as a function of temperature (Y axis) in degrees Centigrade. The X axis, bottom, is in weight percent of the materials defining the alloy in a linear scale. The X axis, top, is in weight percent of the materials defining the alloy in a logarithmic scale.

As illustrated by curve 180, the binary alloy phase diagram of FIG. 4. a material formed of 100% gold and 0% tin has a melting point of approximately 1054.4° C. As the percentage of gold is reduced and replaced by tin, the melting of the alloy is reduced until its lowest temperature of approximately 278° C. at the eutectic point 182 is reached which occurs at a composition by weight of 80% gold and 20% tin, which is the preferred bonding material. As the weight percent of gold is further reduced and replaced by tin, the melting temperature and the degree Centigrade peaks at about a ratio of 37.5% gold and approximately 62.5% tin, that peak point being approximately 419.3° C. Thereafter, as the weight percentage of gold is reduced and replaced by tin, the melting point of the alloy, approaches the melting point of 100% tin which is about 232° C.

Curve 180 essentially depicts the envelope of the melting temperatures of the various alloy materials by weight percent of tin and depicts the eutectic point 182 which occurs at approximately 78° C which is the lowest melting point of the alloy.

Referring again to the magnetic head slider assembly of FIG. 3, the magnetic transducing element 120 is rigidly joined to the slider side surface 110 of slider body 102 by the bonding layer 170. In order to obtain the desired bonding characteristics, the bonding material is interposed between the magnetic transducing element 120 and the side surface 110 of the slider body 102 and the entire assembly is raised to a temperature of approximately 700° C. where the eutectic point of the bonding material is reached for a preselected period of time, such as in excess of twelve (12) hours, resulting in the bonding material being in a liquid state which permits the bonding material to flow into and bond to the surfaces of the ferrite material and the slider body material.

Figure 5:
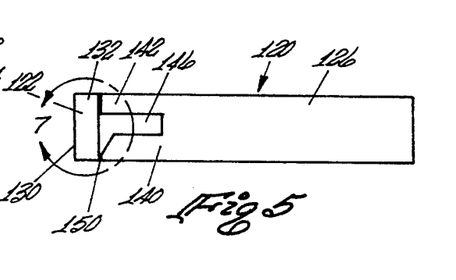
FIG. 5 is a front elevational view of the magnetic head slider assembly of the present invention showing a transverse slot formed in the trailing edge which intersects with the side surface to form an opening therein and wherein the side surface has rigidly joined thereto a magnetic transducing element.

FIG. 5 is a left side view of the magnetic transducing element 120 showing that the "I" bar 122 operatively connected to the "C" bar 126 to form the magnetic transducing element 120. The "C" bar 126 has the winding window 146 formed therein. The one end 130 of the "I" bar 122 is positioned opposite to the extended arm 140 of the "C" bar 126 to form the magnetic transducing gap 150. The details of the magnetic transducing gap are illustrated in FIG. 7.

The other end 132 of the "I" bar is operatively connected to the other extended arm 142 of the "C" bar to form a magnetic flux path between the "I" bar and "C" bar which is positioned opposite the transducing gap 150.

Figure 6:
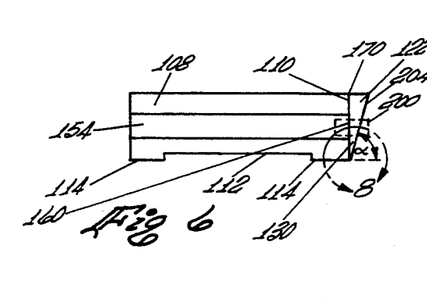
FIG. 6 is a left side elevational view of the magnetic head slider assembly of the present invention showing a transverse slot formed in the trailing edge which intersects with the side surface to form an opening therein and wherein the side surface has rigidly bonded thereto a magnetic transducing element.

FIG. 6 is a rear view of the magnetic head slider assembly of FIG. 3 showing the trailing edge 108 having a transverse slot 154 formed therein. The transverse slot 154 intersects with the side wall 110 to define the opening 160. The trailing edge 108 extends substantially perpendicular to the hydrodynamic surface 112 and to the air bearing surfaces 114 formed thereon. As shown in FIG. 6, the lapped and polished magnetic transducing element is trapezoidal in shape and the "I" bar 122 is shown as having a coil 200 therearound. In the alternative, the magnetic transducing element can be lapped and polished to form a truncated trapezoidal shape or other functionally operative geometry. As shown in FIG. 6, the coil 200 is located in the opening 160 defined by the transverse slot 154 and concurrently passes through the coil winding window 146 defined in the "C" bar as illustrated in FIG. 5. The slope surface 204 may form an acute angle α with a plane defined by the air bearing surfaces 114. By utilizing a sloped surface 204 on the face of the magnetic transducing member 120, the "I" bar is relatively strong so as to be able to withstand the hand winding of a coil 200 therearound without the "I" bar breaking.

Figure 7:
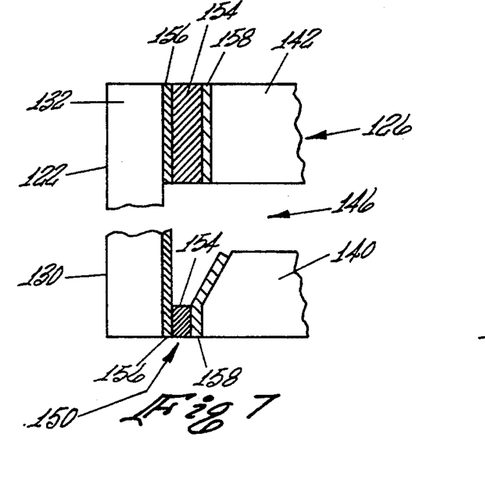
FIG. 7 is a partial pictorial representation of an "I" bar having a pair of ends and a "C" bar having a coil winding window formed in the center thereof and a pair of extended arms wherein one end of the "I" bar is spaced from one of the extended arms of the "C" bar with a magnetically insulating material to form a transducing gap and wherein the other end of the "I" bar is operatively connected by a bonding layer to the other extended arm of the "C" shaped bar to form a magnetic path.

FIG. 7 illustrates pictorially the magnetic transducing element which is formed of the "I" bar 122 and the "C" bar 126. In FIG. 7, the one end 130 of the "I" bar 122 defines a first pole piece which is positioned opposite a second pole piece defined by the one extended arm 140 of the "C" bar 126. The transducing gap 150 is established primarily by the thickness of the magnetically insulating material 154, such as a borosilicate glass, ceramic material or a gold/tin bonding material. In addition, a magnetically permeable material 156, such as alfesil (AlFeSi), may be affixed between the magnetically insulating material 154 and the one end 130 of the "I" bar to increase the magnetic field in the gap and forming MIG. A second magnetically permeable larger 158 may be affixed between the magnetic insulating material 154 and the extended arm 140 of the "C" bar 126 forming a so called "Double MIG" to further increase the magnetic field in the gap.

FIG. 7 also shows that the other end 132 of the "I" bar 122 is positioned opposite to the one extended arm 142 of the "C" bar. The other end 132 is operatively coupled to the other extended arm 142 by means of a magnetically permeable material 156, a magnetically insulating layer 154 and a second magnetically permeable layer 158, again forming a Double MIG.

Figure 8:
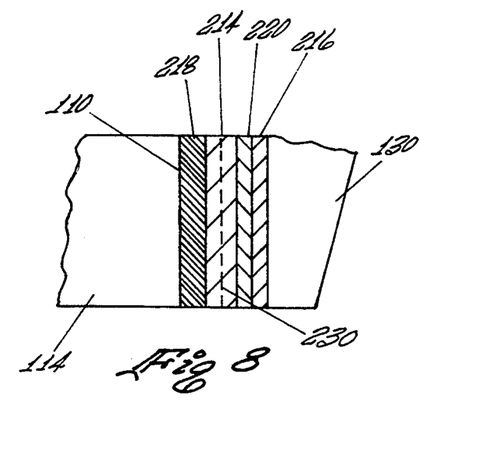
FIG. 8 is a pictorial representation of a slider body having rigidly joined thereto the magnetic transducing element formed of a ferrite wherein the ferrite is rigidly joined to the side surface of the slider body by means of a bonding layer formed of a material by weight of approximately 80% gold and approximately 20% tin together with a diffusion layer and a barrier layer which is located intermediate the diffusion layer and the ferrite.

FIG. 8 illustrates pictorially the preferred embodiment of the means for rigidly joining the slider body to the ferrite material defining the magnetic transducing element.

In FIG. 8, the slider body 114, in the preferred embodiment, is formed of a Calcium Titanate. The slider body 114 has a side wall shown as 110 formed thereon. An adhesion layer 218 and about 50% of the bonding layer 214, in the preferred embodiment being formed of a material by weight approximately 80% gold and approximately 20% tin, are affixed to the side surface 110. Dashed line 214 represents about 50% of the bonding layer 214. The other 50% of the bonding layer 214, an adhesion layer 220 and a thin diffusion layer 216 are affixed to the ferrite core, as depicted by end 130.

By using the teachings of the method described herein, the bonding layer 214 becomes homogenous. It is envisioned that a variation of this method could be used. For example, the entire bonding layer 214 could be affixed to adhesion layer 218 to form the assembly.

The thickness of the bonding layer can be in the range of approximately 40 microinches to approximately 500 microinches. As noted above, a relatively thin diffusion layer shown generally as 216 may be affixed to the ferrite end 130 to prevent migration of undesired molecules or atoms into the ferrite material. Materials that are utilized in a diffusion layer are well known to those skilled in the art. Examples of materials which are utilized as diffusion layers are described in a reference entitled *Auger Spectroslopy Analysis or Metal/Ferrite Interface Layer in Metal-in-Gap Magnetic Head* by K. Kajiwara et al. which appeared in the IEEE Transactions on Magnetics, Vol. 24, No. 6, Nov., 1988, pages 2670 through 2623, inclusive.

Figure 9:
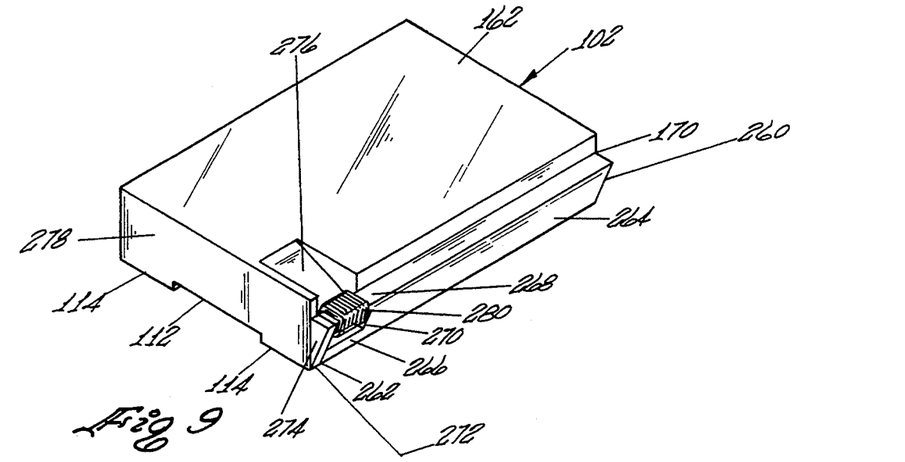
FIG. 9 is a top, left side and front perspective view of another embodiment of a magnetic head slider of the present invention having a winding slot formed in the top surface of the slider body and showing the thickness of the thin ferrite members rigidly joined to the side surface of the slider body prior to lapping and polishing.

FIG. 9 illustrates pictorially an alternate embodiment of the present invention. The slider body 162 has the magnetic transducing element 260 rigidly joined thereto by the bonding material shown generally as bonding layer 170. A coil winding window 270 is formed in the top surface 162 of slider body 102 to facilitate hand winding of a coil 280 around the "C" bar extended arm 268 of the "C" bar 264. The lower extended arm 266 of the "C" bar 264 defines one side of the magnetic transducing gap 262 and end 272 of the "I" bar 274 defines the other side of the transducing gap 262. The trailing edge 278 is planar in that a transverse slot is not required to wind the coil. Note that the height of the ferrite magnetic transducing element 260 is less than the height of the slider body 162 forming a "step".

Figure 10:
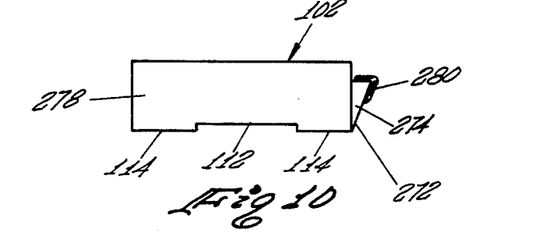
FIG. 10 is a left side elevational view of the magnetic head slider assembly of FIG. 9.

FIG. 10 illustrates a trailing edge 278 of the slider body 102 and shows that the magnetic transducing element 260 is rigidly joined to the slider body 102 by bonding layer 170. As illustrated in FIG. 10, the thickness of the magnetic transducing element 260 is the same on both ends. The reason is that the magnetic transducing element 260 depicts that shape of the thin ferrite elements prior to lapping and polishing. The thickness of the ferrite elements prior to lapping and polishing is approximately 2 mils.

Figures 11, 12:
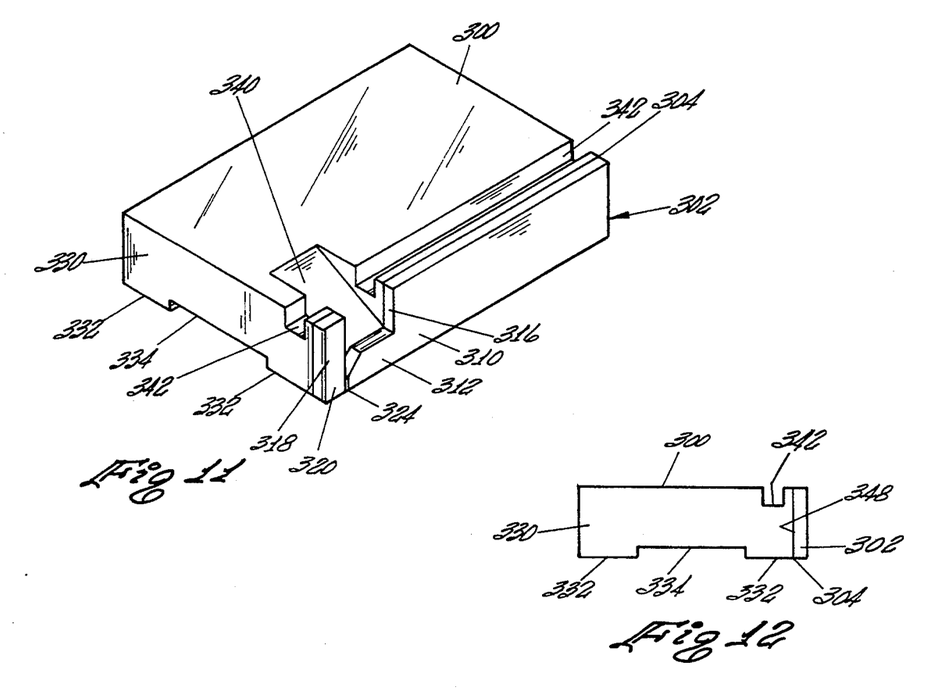
FIG. 11 is a top, left side and front elevational view of the magnetic head slider having a wedge shaped opening formed in the top surface of the slider body which extends into and intersects with the side surface to form an opening therein and wherein the magnetic transducing member is formed of an "I" bar and "C" bar wherein the extended arm of the "C" bar located opposite to the transducing gap is removed to accommodate a sub-assembly structure comprised of a pre-wound coil enclosing an elongated ferrite member.
FIG. 12 is a left side elevational view showing the magnetic head slider body of FIG. 11 having an opening formed therein to receive a sub-assembly comprised of the pre-wound coil including an elongated ferrite member.

FIG. 11 illustrates yet another embodiment of the magnetic head slider assembly of the present invention. The slider body 300 has the magnetic transducing element 302 rigidly joined thereto by means of a bonding layer 304. The "C" bar 310 has a first extended arm 312. The coil winding window is shown as 316. However, the other extended end of the "C" bar 310 has been removed to provide a means for receiving a sub-assembly formed of a pre-wound core enclosing an elongated ferrite member. The "I" bar 318 has an end 320 which is positioned relative to the "C" bar 310 as described hereinbefore to define a transducing gap 324 adjacent the trailing edge 330 and the air bearing surface 332 as described hereinbefore.

A wedge shaped slot 340 is formed in the top surface of the slider body 300 to accommodate a pre-wound core. An elongated groove 342 which extends from the leading edge to the trailing edge 330 is formed in the slider body 300. The elongated groove 342 is spaced from and extends substantially parallel to the side wall of the slider body 300. The end 346 of the elongated groove 342 is adapted to receive the sub-assembly of the pre-wound core enclosing the elongated ferrite member.

FIG. 12 shows the trailing edge 332 of the slider body 300 and shows that the elongated groove 342 is formed perpendicular to the trailing edge 330 adjacent the top surface of the slider body 300 which is located adjacent the side surface 348 of the slider body. The magnetic transducing element 302 is rigidly joined to the side surface 348 by bonding layer 304.

Figure 13:
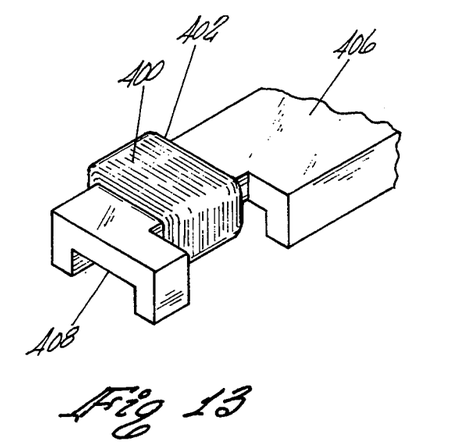
FIG. 13 is a perspective top view showing the sub-assembly formed of a pre-wound core enclosing an elongated ferrite member.

FIG. 13 illustrates the sub-assembly formed of a pre-wound coil 400 which has a central opening 402 extends through the central opening 402. A cutout slot 408 is formed in the elongated ferrite member 406 to cooperate with the end 346 and the "I" bar shown in FIG. 11. The length of the elongated ferrite member 406 is selected so as to be the appropriate length to extend between and join the other end of the "I" bar 318 and the "C" bar 310 as illustrated in FIG. 11 to form a closed magnetic path.

Figure 14:
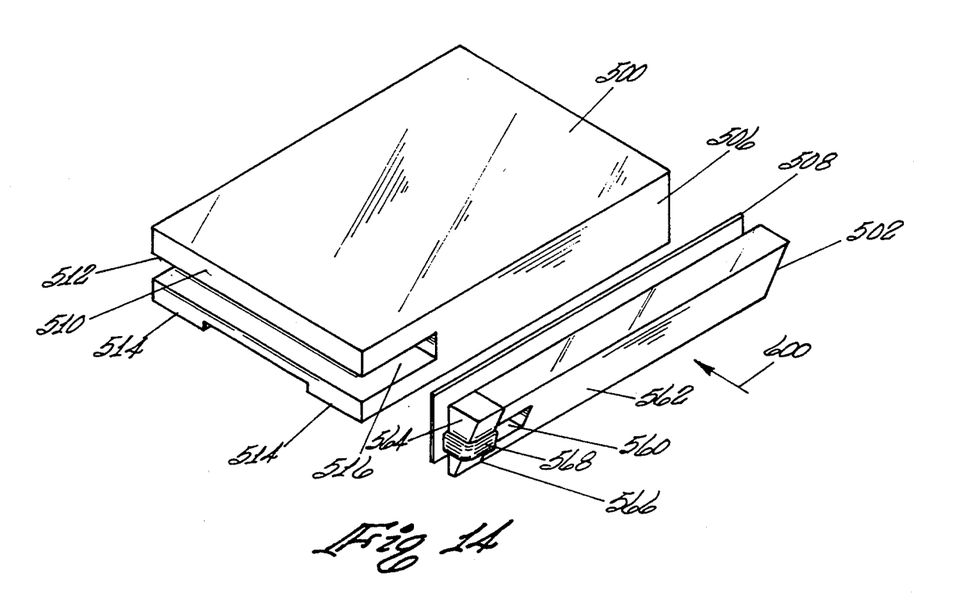
FIG. 14 is an exploded perspective view of the magnetic head slider of the present invention showing the various elements which are utilized during the method for making the magnetic head slider assembly of the present invention.

FIG. 14 is an exploded pictorial representation of the preferred embodiment of the present invention showing a slider body 500 having a side wall 506 which is adapted to have a magnetic transducing element 502 rigidly joined thereto. The side surface 506 is adapted to receive and to have the magnetic transducing element 502 rigidly adjoined thereto by a bonding material 508. The exploded view of FIG. 14 illustrates the various elements which are used in the method of making the magnetic head slider of the present invention. During the process, a clamping force shown by the arrow 600 is required as explained hereinbelow.

FIG. 14 also illustrates that the trailing edge 510 of the magnetic head slider 500 has a transverse slot 512 formed therein which forms an opening 516 which is adapted to be positioned opposite a coil winding window 560 formed in the "C" bar 562. The "I" bar 564 is joined to the "C" bar to form the transducing gap 566 as described hereinbefore. A coil 568 is wound around the "I" bar 564 to complete the magnetic head assembly.

The magnetic head slider assembly of the present invention can be produced by a novel and unique method. The method for fabricating a composite head slider comprises the steps of forming a thin, preferably polycrystaline, magnetic transducing element having an "I" bar having a pair of ends and a "C" bar having a pair of extended arms. The "I" bar and "C" bar includes means for defining a transducing gap between one end of the "I" bar and one extended arm of the "C" bar and means for forming a magnetic path to the other end of the "I" bar and the other extended arm of the "C" bar. The method further includes the step of rigidly joining the magnetic transducing element to one surface of a material defining a slider body.

The method of rigidly joining the magnetic transducing element to the side surface of the slider body may further comprise the steps of clamping the bonding material comprising by weight of approximately 80% gold and 20% tin between the magnetic transducing element and the slider body; and heating for a selected period of time the magnetic transducing element, slider body and bonding material to a temperature at least as high as the eutectic point of the bonding material but less than the temperature where the magnetic characteristics of the magnetic transducing element are impaired.

The method for fabricating the magnetic head slider assembly wherein the "C" bar includes a coil winding window further comprising the step of forming a coil around at least one of the "I" bar and "C" bar and positioning the coil in the coil winding window of the "C" bar.

In the embodiment where the slider body has an angled slot formed therein as illustrated in FIG. 3, the method further comprises steps of forming a coil around and enclosing the "I" bar between the pair of ends wherein the coil is located in the opening of the side surface in the coil winding window of the "C" bar.

In the embodiment having a coil winding slot formed in the top surface of the slider body and which intersects with the side surface, the trailing edge need not have a transverse lot to accommodate the coil winding because the coil winding is located around the extended arm of the "C" bar and not the "I" bar.

As described hereinbefore, the preferred embodiments of the magnetic head slider would be form factors having several discrete form factor percentages suc as 100%, 70%, 25% and 10% or less. However, it is envisioned that the actual form factors could be other than those of the preferred embodiment, such as, for example, 30% instead or 25% or 15% rather than 10%, or other percentage.

The teaching of the present invention would permit fabrication of a magnetic head slider which would have selected dimensions as determined by the application. Of importance is that the magnetic transducing element is relatively thin which would result in a low inductance on the order of 600 milihenries in the area of the transducing gap.

The operating characteristics of the magnetic transducing element utilized in this invention would be at least substantially equal to that of more expensive thin film magnetic head slider assemblies.

What is claimed is:

1. A magnetic head slider comprising
    means defining a slider body having a leading edge, a trailing edge and a side surface extending therebetween, said slider body defining means including means defining an air bearing surface which extends between said leading edge and said trailing edge and which is substantially perpendicular to said side surface;
    means operatively attached to said side surface for defining a magnetic transducing element formed of a ferrite material and having a transducing gap located adjacent said trailing edge and air bearing surface; and
        means for rigidly joining said means defining said magnetic transducing element to said side surface of the slider body wherein said rigidly joining means comprises a bonding layer comprising material by weight of approximately 80% gold and approximately 20% tin, said rigidly joining means further comprising a diffusion layer located between said magnetic transducer defining means and said bonding layer.

2. The magnetic head slider of claim 1 wherein said slider body defining means includes means for defining a transverse slot in said trailing edge which intersects with said side surface forming an opening therein.

3. The magnetic head of claim 1 wherein said magnetic transducer element defining means includes
    means defining a first pole piece located adjacent said trailing edge, said first pole piece defining a first side of a transducing gap; and
    means defining a second pole piece located adjacent said first pole piece forming a second side of the transducing gap, said means defining said second pole piece including means defining a coil winding window located adjacent said transducing gap and in communication with an opening formed by said slider body defining means.

4. The magnetic head slider of claim 3 further comprising
    means defining in said opening and said coil winding window a coil which encloses at least one of said first pole piece and second pole piece.

5. The magnetic head slider of claim 3 wherein said means defining said first pole piece is in the form of an "I" bar having a first end which defines the first side of the transducing gap, and wherein said means defining said second pole piece is in the form of a "C" bar having a pair of extended members wherein one of said pair of extended members is spaced a predetermined distance from and defines the second side of the transducing gap, and wherein the center of said "C" bar defines said coil winding window.

6. The magnetic head slider of claim 5 wherein the "I" bar has a second opposed end which is operatively coupled to the other of said pair of extended members to form a magnetically conductive path.

7. The magnetic head slider of claim 6 further comprising
    means defining a coil which is located in said opening and said coil winding window, said coil enclosing the "I" bar between said first end and second opposed end thereof.

8. The magnetic head of claim 5 wherein said means defining said slider body defines a top surface which is spaced from and substantially parallel to said air bearing surface, said top surface having a wedge-shaped opening formed therein adjacent the trailing edge and side surface, said wedge-shaped opening having a wide end and a small end wherein the wide end intersects with the side surface forming an opening therein.

9. The magnetic head of claim 8 further comprising
    a thin, elongated ferrite member having a selected length and cross-section; and
    means defining a coil having a central opening of a preselected dimension, said coil having said thin, elongated ferrite member passing through the central opening thereof forming a coil ferrite sub-assembly;
    said coil ferrite sub-assembly being dimensioned to be positioned in the wide portion of a wedge-shaped opening located in a slider body and being operatively connected to and joining those portions of the "I" bar and "C" bar located opposite to the magnetic transducing gap to form a closed magnetic path with said coil being positioned in the coil winding window.

10. The magnetic head slider of claim 3 wherein said first pole piece is an "I" bar and said second pole piece is a "C" bar operatively coupled to said "I" bar to define a magnetically conductive core locating said transducing gap adjacent the trailing edge and the air bearing surface.

11. The magnetic head slider of claim 10 further comprising
    means defining in said opening and said coil winding window a coil which encloses the "I" bar.

12. The magnetic head slider of claim 1 wherein said rigidly joining means further comprises
    an adhesion layer located between said bonding layer and said diffusion layer.

13. In combination
    means defining a slider body having a leading edge, trailing edge and a side surface extending therebetween, said slider body including means defining an air bearing surface which extends between said leading edge and said trailing edge and which is substantially perpendicular to said side surface, said trailing edge including means defining therein an elongated slot which is substantially parallel to said air bearing surface and which intersects with said side surface forming an opening therein;

means defining on said side surface of the slider body a magnetic transducing element formed of a ferrite material, said magnetic transducing element means further including means for defining a first pole piece including an "I" bar having a central section forming an first side of a transducing gap located adjacent said trailing edge and said air bearing surface and means for defining a second pole piece including a "C" bar forming a second side of the transducing gap and means defining a coil winding window at a selected location in said second pole piece and spaced from said transducing gap a coil winding window, said "I" bar and said "C" bar being shaped to define a shaped surface which is directed towards said slider body and which intersect at an acute angle a plane defined by the air bearing surface;

means for rigidly joining said magnetic transducer element defining means to said side surface of the slider body with the coil winding window positioned in communication with said opening formed in said side surface, said rigidly joining means comprising a bonding layer comprising material by weight of approximately 80% gold and approximately 20% tin and a diffusion layer located between said magnetic transducer element defining means and said bonding layer; and means for defining in said opening and said coil winding window a coil which encloses the central portions of said "I" bar.

14. The combination of claim 13 wherein the sloping surface terminates in an elongated bottom edge and further comprising means defining said elongated bottom edge as a shaped surface for improving the hydrodynamic characteristics of the combination.

15. A transducing head adapted to be operatively attached to a side surface of a slider body wherein the side surface is substantially normal to and extending from an air bearing surface formed on the slider body, said transducing head comprising means defining a magnetic transducer means formed of a ferrite material for defining at a selected location on a side surface of a slider body adjacent an air bearing surface a transducing gap; and means for rigidly joining said means defining said ferrite material to a side surface of a slider body wherein said rigidly joining means comprises a bonding layer comprising material by weight of approximately 80% gold and approximately 20% tin, said rigidly joining means further comprising a diffusion layer located between said magnetic transducer defining means and said bonding layer.

16. The magnetic head of claim 15 is further comprising a slider wherein said slider has a top surface spaced from the air bearing surface and a second side surface spaced from said side surface and wherein said slider has outer dimensions which are selected to be about 0.034 inches between said top surface and air bearing surface, a length between said leading edge and trailing edge of about 0.160 inches and a width between said side surface and second side surface of about 0.126 inches.

17. The magnetic head of claim 15 further comprising a slider wherein said slider has a top surface spaced from the air bearing surface and a second side surface spaced from said side surface and wherein said slider has outer dimensions which are selected to be about 0.024 inches between said top surface and air bearing surface, a length between said leading edge and trailing edge of about 0.112 inches and a width between said side surface and second side surface of about 0.088 inches.

18. The magnetic head of claim 15 further comprising a slider wherein said slider has a top surface spaced from the air bearing surface and a second side surface spaced from said side surface and wherein said slider has outer dimensions which are selected to be about 0.017 inches between said top surface and air bearing surface, a length between said leading edge and trailing edge of about 0.080 inches and a width between said side surface and second side surface of about 0.063 inches.

19. The magnetic head of claim 15 further comprising a slider wherein said slider has a top surface spaced from the air bearing surface and a second side surface spaced from said side surface and wherein said slider has outer dimensions which are selected to be about 0.080 inches between said top surface and air bearing surface, a length between said leading edge and trailing edge of about 0.040 inches and a width between said side surface and second side surface of about .030 inches.

20. The magnetic head of claim 15 further comprising a slider wherein said slider has a top surface spaced from the air bearing surface and a second side surface spaced from said side surface and wherein said slider has outer dimensions which are selected to be about 0.004 inches between said top surface and air bearing surface, a length between said leading edge and trailing edge of about 0.016 inches and a width between said side surface and second side surface of about 0.013 inches.

21. A magnetic head slider assembly adapted for flying on an air cushion over a moving magnetic media for recording and reproducing tracks of information, said magnetic head slider assembly comprising means for defining a slider body, said slider body defining means including means for defining a hydrodynamic surface which is adapted to fly over the moving magnetic media means for defining a trailing edge located rearward of said hydrodynamic surface;

means defining a side surface which extends substantially normal from said aerodynamic surface and which extends forward of said trailing edge; and means for defining a magnetic transducing element formed of a ferrite material and having a transducing gap located adjacent said trailing edge and hydrodynamic surface; and bonding means comprising material by weight of approximately 80% gold and approximately 20% tin for rigidly joining said magnetic transducing element defining means to said side surface, said bonding means further comprising a diffusion layer located between said magnetic transducer defining means and said bonding means.

22. The magnetic head slider assembly of claim 21 wherein said means defining a hydrodynamic surface includes mean defining a shaped air bearing surface which is adapted to fly over the moving magnetic media.

23. The magnetic head slider assembly of claim 21 wherein said trailing edge defining means includes
means for defining through the trailing edge a transverse slot which is spaced from and extends substantially perpendicular to said hydrodynamic surface.

24. In combination
means defining a slider body having a leading edge, trailing edge and a side surface extending therebetween, said slider body including means defining an air bearing surface which extends between said leading edge and said trailing edge and which is substantially parallel to said side surface, said trailing edge including means defining therein an elongated slot which is substantially perpendicular to said air bearing surface and which intersects with said side surface forming an opening therein;
means defining on side surface of the slider body a magnetic transducing element formed of a ferrite material, said magnetic transducing element means further including means for defining a first pole piece forming a first side of a transducing gap located adjacent said trailing edge and said air bearing surface and means for defining a second pole piece forming a second side of the transducing gap and means defining a coil winding window at a selected location in said second pole piece and spaced from said transducing gap; and
means for rigidly joining said magnetic transducer element defining means to said side surface of the slider body wherein said rigidly joining means comprises a bonding layer comprising material by weight of approximately 80% gold and approximately 20% tin, said rigidly joining means further comprising a diffusion layer located between said magnetic transducer defining means and said bonding layer, said magnetic transducing element defining means having the coil winding window being positioned relative to said side surface to place said coil winding window in communication with said opening formed in said side surface.

25. The combination of claim 24 wherein the magnetic transducing element defining means includes means for forming a magnetic path at one location between the first pole piece and second pole piece and means defining said transducing gap therebetween at a second opposed location.

26. The combination of claim 24 further comprising means defining in said opening and said coil winding window a coil which encloses said means defining at lest one of said first pole piece and said second pole piece.

27. The combination of claim 26 wherein said first pole piece is an "I" bar having a central portion and said coil encloses the central portion of said "I" bar.

28. The combination of claim 26 wherein said first pole piece is an "I" bar and said second pole piece is a "C" bar.

* * * * *